Jan. 18, 1927.
F. W. BEDARD
1,614,821
AUTOMOBILE HEADLIGHT
Filed Dec. 22, 1925    2 Sheets-Sheet 2
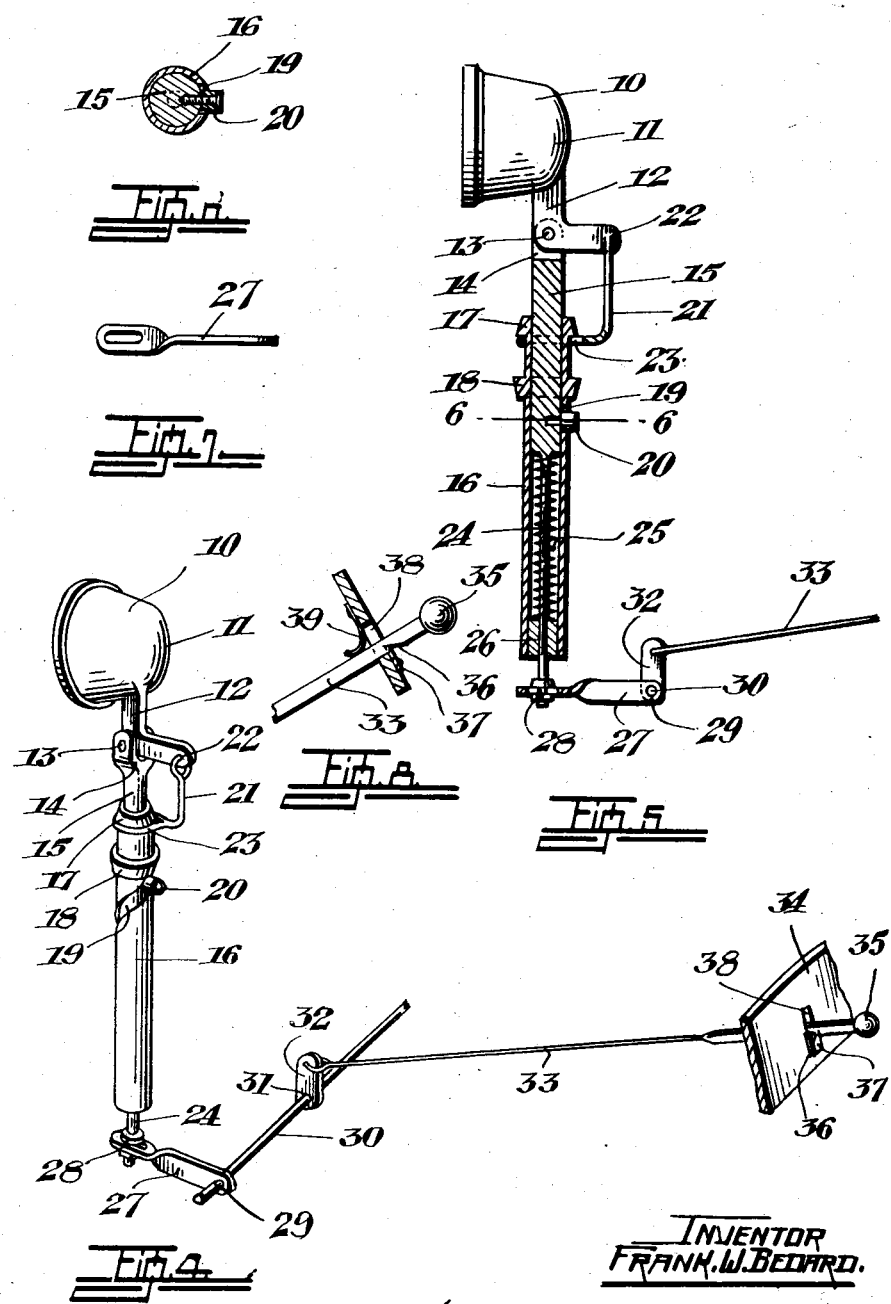
INVENTOR
FRANK.W.BEDARD.
BY
ATTYS.

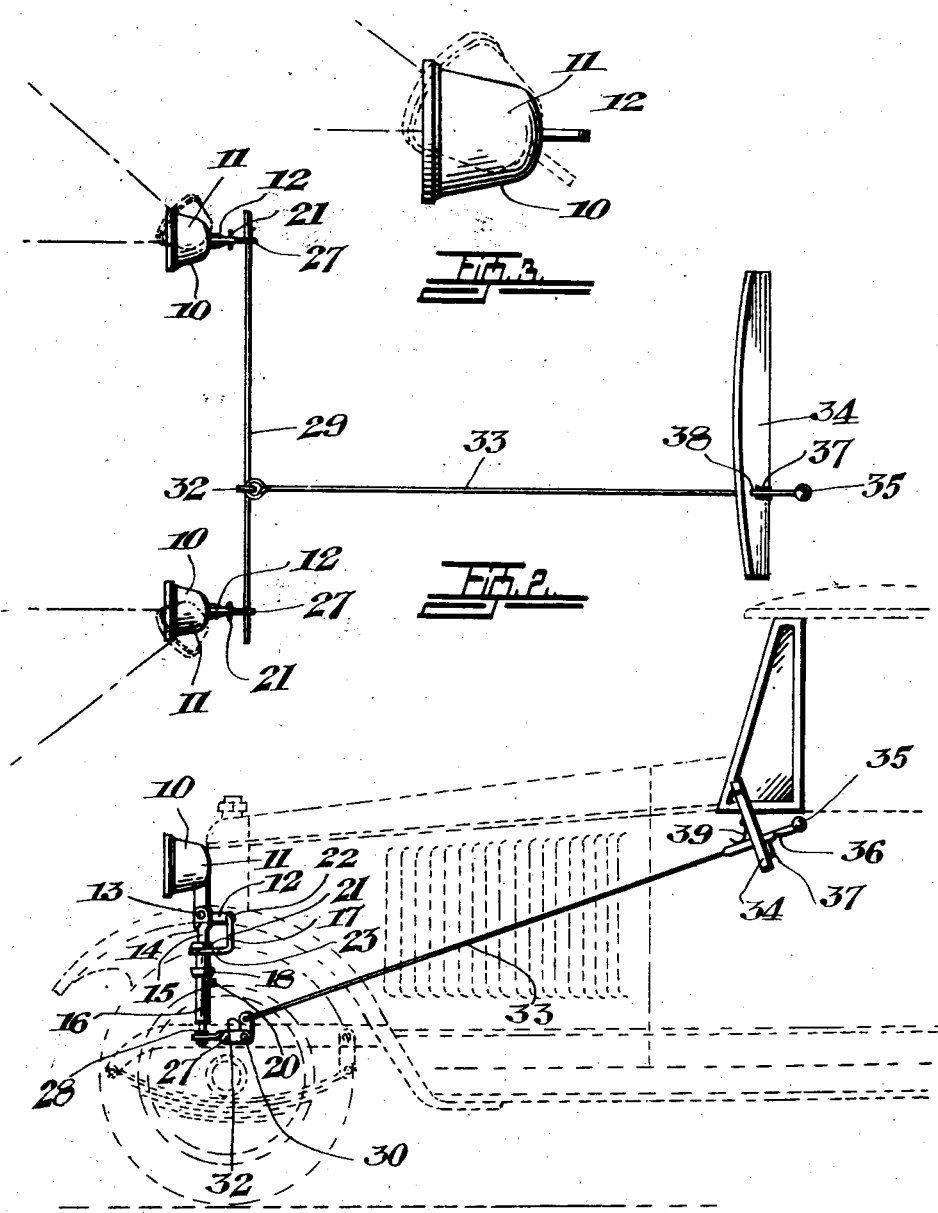

Patented Jan. 18, 1927.

1,614,821

UNITED STATES PATENT OFFICE.

FRANK WILFRED BEDARD, OF OTTAWA, ONTARIO, CANADA.

AUTOMOBILE HEADLIGHT.

Application filed December 22, 1925. Serial No. 77,088.

This invention relates to improvements in automobile headlights, and the objects of the invention are to provide an automobile headlight designed to overcome the glare and blinding effects of the glare from approaching automobiles with headlights lighted.

A further object is to provide an adjustably mounted headlight operable from the driver's seat to be simultaneously tilted and turned to automatically divert the beam of light from the front to the side of the automobile and whereby the glare is thus diverted from the roadway in front of the automobile to light the ditch on one side and the road on the other side, thus materially facilitating and safeguarding the passage at night of one light-carrying vehicle with another.

A further object is to provide an adjustably mounted headlight of this description that will automatically assume its normal position on the operating means being released.

A further and essential object is to provide an adjustably mounted headlight of the character described comprising few parts, of simple construction and designed to be fitted to automobiles of existing construction without materially affecting same, and which can be manufactured at low cost while giving in use most satisfactory service.

With the foregoing and other objects in view, the invention consists essentially of a headlight tiltably mounted on a suitable supporting stem adapted to slidably engage with a supporting socket provided with a tortuous guideway, and means on the stem designed to engage with the guideway to turn the headlight, and mechanism operable from the driver's seat for sliding the stem downwardly, and spring-actuated means on the stem to permit it to return automatically in engagement with said guideway to normal position to return the headlight to normal horizontal position.

Referring now to the drawings, in which like characters of reference indicate corresponding parts in each figure:—

Figure 1 is a side elevation showing an automobile in dotted lines fitted with my improved headlight, Figure 2 is a plan view of my invention comprising a pair of headlights and means operable from the driver's seat for operating them, Figure 3 is a top plan view of the headlight in normal position with dotted lines showing same in tilted and turned position, Figure 4 is a perspective view of one of the headlights with the operating mechanism for both headlights, Figure 5 is a longitudinal section through the headlight support, Figure 6 is a section on line 6—6 of Figure 5, Figure 7 is a plan of the lever connecting the stem with the operating mechanism, Figure 8 is a section through the instrument board showing the operating rod extending therethrough.

Referring now more particularly to the drawings, in which a preferred form of my invention is illustrated, the essential features comprise headlights 10 of any well known construction having integral with the casing 11 thereon (as illustrated in different figures) an L-shaped shank 12. This shank is pivotally mounted as at 13 in the bifurcated end 14 of a supporting stem 15 which in turn is slidably mounted in a socket member 16. This socket member is provided with collars 17 and 18, having formed adjacent to the collar 18 a tortuous or corkscrew shaped guideway 19 designed to engage with a roller 20 carried by the supporting stem 15 whereby, on the stem being moved downwardly, the roller 20 travelling in the guideway 19 will automatically cause the stem 15 to turn, carrying with it the headlight.

Means are provided for tilting the headlight downwardly simultaneous with this operation comprising the link 21 suitably connected to the outer end of the L-shaped shank 12 as at 22 and having formed thereon an eye 23 to loosely engage with the member 16 between the collars thereon 17 and 18 so that when the headlight is turned by the above described operation the free engagement of the connecting link 21 with it will in no way hamper the movement.

The lower portion of the stem 15 is rod-shaped as at 24 to carry therearound spring-actuating means 25 in the form of a coil spring so that on the stem being released it will normally assume the position from which it has been moved. This portion of the stem extends through and beyond the bottom of the socket 16 as at 26, here to be connected to the operating mechanism in turn operable from the driver's seat, and comprising a lever arm 27 suitably formed and connected at its inner end as at 28 to the end of the stem 15. The other end of this lever arm is rigidly connected in any suitable manner as at 29 to a cross rod 30 pivotally mounted at each end in the chassis and intermediate of its ends having rigidly mounted thereon at 31, arranged at substantially right angles to the horizontally extending lever arm 27, a second lever arm 32. This lever arm 32 is suitably connected to one end of an operating rod 33, the other end of which extends through the instrument board 34 and is provided with a knob 35 and notched at 36 to engage with the plate 37 at the opening 38 in the instrument board through which this rod passes. A flat spring 39 is also provided on the back of the instrument board to engage with the rod to automatically retain it in position.

It will thus be seen that normally, as illustrated in Figures 1, 2, 4 and 5, the headlight will be in position to illuminate the path or road ahead of the automobile in the ordinary way. Then, on another machine approaching, instead of, as heretofore, dimming these lights to eliminate the glare, the driver pulls the rod 33 through the knob 35 causing the rod 30 to rotate, thereby moving the lever arm 27 downwardly bringing with it the stem 15 which carries a roller 20 along the tortuous passage or guideway 19 and with it the shank 12, simultaneously causing both to turn, carrying the headlights with them. At the same time the downward movement of the stem 15 causes the L-shaped shank 12 to engage with the collar 18 limiting said travel and automatically tilting the headlight. It will thus be seen that the turning and tilting of the headlight is simlutaneous and that the light and glare therefrom is divirted from the road in front of the machine to the side to illuminate the ditch on the one side and the right of way on the other side to the oncoming vehicle. Then, on said vehicle passing, the driver will lift the rod 33 out of engagement with the plate 37 when, due to the action of the coil spring 25 wound on the rod portion 24 of the stem 15, the stem 15 will automatically move upwardly causing the roller 20 to go back into engagement in the guideway 19 to assume a normal position, automatically turning the lamp back at the same time, and automatically causing it to assume its untilted position through the member 21.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A headlight for automobiles adapted to be simultaneously moved downwardly, turned and tilted, comprising a pivotally mounted shank, a socket member with a trackway therein, a supporting stem slidably mounted in the socket member and designed to engage with said trackway, collars on the socket member, a link connected to the shank and slidable between said collars, whereby, on the stem being operated the headlight is simultaneously tilted, turned and moved downwardly.

2. In a device of the character described, a socket member formed with a guideway and provided with collars, a stem slidably mounted in the socket member, a headlight pivotally mounted on the stem and link connected to the socket member, means carried by the stem to engage with the socket member guideway, whereby, on the stem being moved downwardly, the headlight carrying shank is carried downwardly and automatically turned, stops on the socket member, whereby, on a predetermined point being reached in the downward travel of the stem, the shank connecting link engages with said collars to tilt the headlight.

3. In a device of the character described, a socket member formed with a guideway and provided with collars, a stem slidably in the socket member, a headlight provided with a shank pivotally mounted on the stem and slidably connected to the socket member, means carried by the stem to engage with the socket member guideway, whereby, on the stem being moved downwardly, the headlight carrying shank is carried downwardly and automatically turned with the headlight, and whereby, on a predetermined point being reached in the downward travel of the stem, the shank connecting link engages with said collars to tilt the headlight, and spring actuating means for causing the headlight to automatically return to normal position.

4. In a device of the character described, an adjustably mounted headlight comprising a socket member formed with a tortuous passageway therein, a stem slidably mounted in said member and formed with means to engage with the passageway, a shank pivotally mounted on the stem, stops on the socket member, a loosely mounted collar between said stops operatively connected to the shank for operating the stem, and spring actuating means for permitting the stem, when operated, to automatically assume a normal position.

5. In a headlight for automobiles, a spring actuated stem, a socket member designed to slidably engage with the stem, a lamp-carrying member tiltably mounted on the stem, spaced travel-limiting means on the socket member and means operable therebetween connected to the lamp-carrying member, whereby, on the headlight being lowered it is simultaneously and automatically tilted, and whereby, on the stem being lowered, the headlight is automatically turned.

6. In a headlight for automobiles, a spring actuated stem, a socket member designed to slidably engage with the stem, a lamp-carrying member tiltably mounted on the stem, spaced travel-limiting means on the socket member, and means operable therebetween and connected to the lamp-carrying member, whereby, on the headlight being lowered, it is simultaneously and automatically tilted, and whereby, on the stem being lowered, the headlight is automatically turned, and whereby, on the stem being released, it automatically assumes, with the headlight, a normal vertical position, and mechanism operable from a distance connected to the stem.

In witness whereof I have hereunto set my hand.

FRANK WILFRED BEDARD.